3,403,071
LAMINATED PLASTICS AND METHOD OF MAKING SAME

John F. Perry, Maidenhead and Ian Williamson, Flackwell Heath, England, assignors to Formica International Limited, London, England, a British company
No Drawing. Continuation-in-part of application Ser. No. 414,421, Nov. 27, 1964. This application May 2, 1966, Ser. No. 546,541
Claims priority, application Great Britain, Dec. 6, 1963, 48,383/63; May 6, 1965, 19,190/65
14 Claims. (Cl. 161—189)

ABSTRACT OF THE DISCLOSURE

Phenol- and urea-formaldehyde resin laminates having exceptionally good resistance to weathering are obtained by providing a protective layer of a fluorine-containing polymer, specifically polyvinyl fluoride, which is bonded to the body of the laminate by means of a layer of an aminotriazine-aldehyde resin.

---

This application is a continuation-in-part of our co-pending application Ser. No. 414,421 filed Nov. 27, 1964, now abandoned.

This invention relates to laminated plastics and their production, and in particular to laminated plastics which have good resistance to weathering.

Laminated plastics are customarily produced by the application of heat and pressure to an assembly comprising one or more fibrous core sheets impregnated with a thermosetting resin, for example a phenol-formaldehyde or urea-formaldehyde resin, with optionally a decorative or printed layer impregnated with a resin of the same type or of some other type, especially a urea-formaldehyde or an aminotriazine-formaldehyde (e.g. melamine-formaldehyde) resin or the like, and a protective surface layer formed from an alpha-cellulose paper impregnated with an aminotriazine resin. During the laminating operation, and while the impregnating resins are being cured, the alpha-cellulose paper layer becomes transparent, and the whole is consolidated into a unitary article.

Many attempts have been made to improve the wear resistance and hardness of laminates of this general type, and the most satisfactory method to date has been that described above, namely the superimposition of a transparent protective layer comprising a melamine resin-impregnated paper over the less durable decorative layer. Such transparent layers are not as weather-resistant as are some known decorative materials, which however have not been used because it has been difficult to form strong bonds between them and the core laminate sheets. Also, the protective layers at present used transmit ultra-violet light, which has been found to act on the underlying decorative layer to change and degrade the colour and to produce aging and other forms of deterioration of the initially pleasing surface.

In one aspect the present invention comprises a laminated plastic in which a protective layer of a film-forming fluorine-containing organic polymer is bonded to a phenol-formaldehyde, urea-formaldehyde or phenol-urea-formaldehyde resin-impregnated core by means of an adhesive layer comprising an aminotriazine-formaldehyde or substituted aminotriazine-formaldehyde resin. In another aspect it comprises the method of producing a laminated plastic having good resistance to weathering, which comprises bonding a protective layer of a film-forming fluorine-containing organic polymer to a phenol-formaldehyde, urea-formaldehyde or phenol-urea-formaldehyde resin-impregnated core by means of heat and pressure, using as an intermediate adhesive layer a layer comprising an aminotriazine-formaldehyde or substituted aminotriazine-formaldehyde resin. (In what follows the expression "phenol-formaldehyde or urea-formaldehyde" is to be understood as including "phenol-urea-formaldehyde.")

As the fluorine-containing polymer it is preferred to use polyvinyl fluoride, and as the resin component of the adhesive layer a melamine-formaldehyde resin; for the sake of brevity therefore the invention will be more particularly described with reference to these resins. It will, however, be understood that other fluorine-containing polymer may be used, e.g. polyvinylidene fluoride, or even polytrifluorochloroethylene or polytetrafluoroethylene when a highly inert and water-resistant surface is required. Similarly other aminotriazine (including substituted aminotriazine) resins may be used in the intermediate layer, notably methyl melamine, butyl melamine (or other lower alkyl or aryl melamine) or benzoguanamine.

It is preferred to incorporate in the protective layer one or more pigments or other materials capable of reducing substantially its transmission of ultra-violet light (as this greatly reduces deterioration and weakening of the bond with time), or increasing the resistance of the protective layer to heat (which also weakens the bond with time), or both. Examples of such materials are, among substantially transparent organic substances capable of absorbing ultra-violet light, polyhydroxy-benzophenones, e.g. 2,4-dihydroxy, 2-hydroxy-4-methoxy-benzophenone, 2-hydroxy-4-methoxy-4-methylbenzophenone, sodium 2-hydroxy-4-methoxybenzophenone-4-sulphonate, and 2-hydroxy-4-methoxy-5-sulphobenzophenone trihydrate and also ultra-violet absorbing polyaddition compounds such as copolymers of addition-polymerisable ethylenically unsaturated compounds with 2-(2'-hydroxyphenyl)benztriazole; heat stabilizing compounds include water-soluble salts of barium and strontium, e.g., barium perchlorate or strontium nitrate. Mixtures of two or more such agents can also be used.

If it is not important to retain transparency, a pigment, such for example as titanium dioxide (white), chromium oxide (green), and iron oxide (red) pigments may be used, as may certain coloured dyestuffs having good ultra-violet absorption. While such pigments and dyestuffs may make the presence of an intermediate decorative layer unnecessary, the products obtained by their use are found to possess in themselves a very attractive appearance.

While it is usually most convenient to apply the protective layer as a pre-formed sheet or film, it may if desired be formed in situ by melting the polyvinyl fluoride (containing any desired additives) onto the intermediate adhesive layer at any time before the final cure. When the protective layer is applied as a pre-formed sheet or film, one convenient way of making the laminates is to pass an assembly comprising the protective layer, intermediate adhesive layer, and resin-impregnated core sheets between heated nip rollers.

Any known core layer, or assembly of core layers, in which the impregnating resin is a phenol-formaldehyde or a urea-formaldehyde resin may be used.

The substituted aminotriazine aldehyde resins which are suitable for use in the invention may be prepared from aldehydes or derivatives of aldehydes by reaction with mono-, di- and tri-substituted melamines or the like, for example triphenylmelamine, guanamines, or the like such as acetoguanamine or benzoguanamine, or mixtures of any of the above compounds and/or their derivatives. The reactants from which the resins are made may include also other reactive amino compounds which will react with aldehydes, such as guanidines, aminoguanidines, urea-guanyl, urea, ethylene urea, guanyl thiourea, alkyl ureas, dicyandiamine, biguanides, or sulphonamides. The preferred aldehyde is formaldehyde, but other aldehydes are also suitable, for instance acetaldehyde, propionaldehyde, butyraldehyde, or benzaldehyde. The aldehydes may if desired be used in the form of derivatives, for example formaldehyde may be used as paraformaldehyde hexamethylene tetramine, either alone or mixed with any of the above aldehyde. Also certain other di- and tri-aminotriazines (e.g. 1,3-diazine) form suitable resins when reacted with the appropriate aldehyde or aldehydes.

The aldehyde will usually be in a molecular excess, preferably in amount 1.5–6, and especially 1.75–2.25, molecular proportions for each molecular proportion of reactive amino in the other reactant.

Substituents may if desired be introduced into the aminotriazine aldehyde resins either during their formation or at some later time, whichever is the most convenient. Thus, reaction products containing hydroxymethyl groups may be modified by etherifying some or all of these groups and converting them to, say, butoxymethyl groups.

The intermediate adhesive layer may consist solely of the melamine-formaldehyde (or other aminotriazine) resin, or it may contain also one or more other resinous maetrials, such for example as a phenol-formaldehyde or urea-formaldehyde resin, though it is preferable that the aminotriazine resin makes up more than half and especially more than 70% of the total resin. (All proportions are by weight.) It may also contain a polymer having a softening or plasticising action, preferably a polyvinyl acetal such as polyvinyl butyral, e.g. in amount between about 10 and 50% on the resin content (excluding the said polymer).

The aminotriazine resin sheet may serve other purposes besides acting as an adhesive between the core and the protective layer. For example, it may, when the protective layer is transparent, serve as a decorative sheet, and for this purpose it may if desired carry a pattern. Frequently it will contain a fibrous reinforcing material, such for example as a paper, e.g. an alpha-cellulose paper, and such a paper may carry a desired printed or other pattern. If desired a plurality of layers containing an aminotriazine resin can be used; for example a decorative layer may be followed by a fibre-reinforced or unfilled thin transparent layer, which in turn carries the polyvinyl fluoride protective layer. Especially when an intermediate adhesive layer overlies a printed decorative sheet, it may with advantage contain a substantially colourless and transparent compound capable of absorbing ultra-violet light, for example one or more of those listed above.

The protective layer will usually be applied as a preformed film, the surface of which may with advantage have been given a treatment to render it more amenable to bonding. Many such treatments are known and may be used in the present instance. Usually they involve some form of limited surface oxidation or other chemical treatment whereby polar, usually oxygen-containing, groups are formed on the surface of the film, e.g. by the action of a flame, by irradiation in the air, or by treatment with an oxidizing agent, but physical treatments, involving, for example, the roughening of the surface, may also be employed. As already indicated, such treatments are well known and need not be described here in detail.

The final heat and pressure curing step may be carried out by conventional methods, using conditions of temperature and pressure appropriate to the particular combination of layers to be united. It has been found that the presence of a pigment in the polyvinyl fluoride layer to some extent facilitates bonding, in the sense that a sufficient bond can usually be obtained at a lower pressure and perhaps also a lower temperature than with an unpigmented sheet. Likewise, bonding may be facilitated by applying the intermediate adhesive layer as a coating instead of as a pre-formed film or resin-impregnated fibrous sheet, or by increasing the ratio of formaldehyde to triazine in the resin. In any particular instance no difficulty will be encountered in determining suitable conditions by simple test.

In certain cases, especially when the protective layer contains an ultra-violet absorbant, it may be desirable to use a thin release sheet between it and the press plate of the mould, e.g. a very thin separate polyvinyl fluoride film.

The invention is illustrated by the following examples. Proportions are by weight.

EXAMPLE 1

A roll of 210 gram kraft paper was treated with a solution of phenol-formaldehyde resin to give a resin content between 40% and 45% and was thereafter dried to a stage at which the resin was only partly cured and had a volatile content of between 3 and 5%. Equal sized core sheets were cut from the roll and assembled in a stack of 7 sheets. A layer comprising a sheet of paper impregnated with melamine-formaldehyde resin was superimposed on the stack followed by a polyvinyl fluoride film 0.05 mm. thick pigmented with titanium dioxide ("Tedlar"). (Other white pigments could be used in place of the titanium dioxide.) The assembly was placed in a press and raised to a temperature of 140° C. during a period of 40 minutes, followed by 40 minutes at 146°–148° C. under a pressure of 78.4 kg./cm.$^2$.

As a control, the above procedure was repeated save that the polyvinyl fluoride film was bonded directly to the top of the stack of core sheets.

The laminates obtained, designated Laminates I and II, respectively, were tested as follows:

Each laminate was immersed in water at 100° C. for 100 hours, and the surface examined for blistering, yellowing, and gloss.

The blistering test gives the percentage of the total surface occupied by blisters, determined by counting the blisters and multiplying by their average area. The yellowness index was determined by Federal Test Method Standard No. 141, using a tri-stimulus analyser. The gloss measurement gives the percentage reflection as compared with a standard gloss surface.

The results obtained are given in Table I.

TABLE I

| Laminate | Area of Blistering, percent | Yellowness index | | Gloss measurement | |
|---|---|---|---|---|---|
| | | Before test | After test | Before test | After test |
| I | <1 | 3.7 | 8.5 | 88 | 20 |
| II | 5 | 17.9 | 23.3 | 57 | 25 |

The two laminates were also compared for resistance to ultra-violet light, heat and humidity, and the results obtained are shown in Table II.

TABLE II

| Laminate | Yellowness index | | Difference | Gloss measurement | | Difference |
|---|---|---|---|---|---|---|
| | Before test | After 90 day exposure | | Before test | After 90 day exposure | |
| I | 3.7 | 3.5 | 0.2 | 88 | 70 | 18 |
| II | 17.9 | 10.0 | 7.9 | 57 | 21 | 36 |

The two laminates were subjected to a test cycle of 8 hours ultra-violet light followed by 16 hours high humidity for one week and 16 hours ultra-violet light and 8 hours high humidity for a second week, the cycle being repeated continuously until the 90 day exposure period was completed. The fall in the Yellowness Index in Table II indicates to what extent the laminates have bleached under action of the ultra-violet light.

Similar laminates are obtained when a similar layer of polyvinylidene fluoride is substituted for the polyvinyl fluoride layer of the above example. Also the polyvinyl fluoride layer may contain, instead of the titanium dioxide pigment, one or more ultra-violet absorbers capable of absorbing radiation in the wavelength range 2000–4000 A., in which case the paper sheet of the intermediate (melamine-formaldehyde resin) layer is printed with a decorative pattern.

EXAMPLE 2

A roll of 210 gram kraft paper was treated with a solution of phenol-formaldehyde resin to give a resin content of 35% and was thereafter dried to a stage at which the resin was only partly cured and had a volatile content of 6–8%. Equal sized core sheets were cut from the roll and a stack of 7 sheets assembled. A layer comprising a sheet of paper impregnated with melamine-formaldehyde resin was superimposed on the stack, followed by a film 0.05 mm. thick of polyvinyl fluoride pigmented with yellow pigment. The assembly was placed in a press and raised to a temperature of 140° C. during a period of 35 minutes, followed by 25 minutes at 135° to 140° C. under a pressure of 98 kg./cm.$^2$. As a control the above procedure was repeated save that the polyvinyl fluoride layer was bonded directly to the top of core sheets. The laminates obtained, designated Laminates III and IV, respectively, were tested by immersion in water at 100° C. as described above. The time taken for each laminate to be affected by blistering, delamination or reduction of bond strength was then noted.

Test results

Laminate III showed no delamination after 500 hours continuous immersion in boiling water.

Laminate IV failed after 110 hours immersion, the bond strength between the polyvinyl fluoride film and the core sheets having been reduced to such an extent that the film could be removed by ordinary peeling. Even after only 32 hours the bond was so weakened that the film could be partially removed from the core sheets, complete removal being prevented only by random tearing of the polyvinyl fluoride sheet as it was stripped off.

EXAMPLE 3

The procedure of Example 2 was repeated, save that a mixture of phenol-formaldehyde, polyvinyl butyral and melamine formaldehyde was used as an intermediate adhesive to bond a polyvinyl fluoride film to phenol-formaldehyde core sheets. The laminate produced was designated Laminate V.

Test results

After 400 hours in boiling water Laminate V showed no visible change and no sign of delamination. A control laminate, designated Laminate VI, containing no melamine-formaldehyde in the intermediate adhesive layer failed after 32 hours, the film tearing on stripping; the bond between the two layers was completely destroyed after 104 hours.

EXAMPLE 4

The procedure of Example 2 was repeated, save that polytetrafluorethylene film was used instead of polyvinyl fluoride film and a melamine-formaldehyde resin impregnated paper overlay was used over the phenol-formaldehyde core sheets.

The laminate so obtained was designated Laminate VII, and a control designated Laminate VIII, wherein the polytetrafluorethylene film was bonded directly to the phenol-formaldehyde core sheets, was also made. The following test results were obtained:

Laminate VII showed no delamination after 100 hours. In Laminate VIII the bond was completely destroyed after 56 hours, as shown by the peel test.

EXAMPLE 5

A laminate assembly was prepared consisting of 6 phenol-formaldehyde resin-impregnated core sheets; a melamine-formaldehyde resin-impregnated print sheet carrying a design in a red dye; a melamine-formaldehyde resin-impregnated overlay sheet containing 0.25% of 2-hydroxy-4-methoxy-4-methylbenzophenone; and a protective layer of transparent (unpigmented) 100 gauge polyvinyl fluoride film. The assembly was cured under a pressure of 98 kg./cm.$^2$ at a temperature rising to 135° C. over 20 minutes and then kept at 135°–145° C. for 25 minutes.

Both products were submitted to a weathering test, being exposed to ultra-violet radiation from a xenon lamp for 12 hours a day at 23°±2° C. and a relative humidity of 80% ∓20%, being sprayed with water for 5 minutes in every 30 minutes. In both cases the bond was found to be substantially unaffected after 45 days, but in the laminate containing no ultra-violet absorbant the colour in the print sheet had faded to a marked extent after 20 days.

EXAMPLE 6

A core assembly consisting of a single light phenol-formaldehyde resin-impregnated lower surface sheet and six phenol-formaldehyde resin-impregnated core sheets was laminated with a melamine-formaldehyde resin-impregnated overlay sheet followed by a 400 gauge transparent polyvinyl fluoride film as a protective layer, curing for 10 minutes at 165° C. under a pressure of 160 kg./cm.$^2$. A good bond resulted, without any observable distortion of the intermediate adhesive print sheet.

EXAMPLE 7

Example 6 was repeated, except that before the addition of the polyvinyl fluoride film to the assembly and the final curing there described, the remainder of the assembly was given a preliminary cure at about 80 kg./cm.$^2$, the temperature being raised to 140° C. in 40 minutes and kept there for a further 40 minutes. Again the product withstood successfully the test described in Example 1.

EXAMPLE 8

A film of unpigmented polyvinyl fluoride, having one side "surface activated," was coated on the activated side with an adhesive composition obtained from melamine and formaldehyde in a molar ratio of 1.0:1.75. The composition was obtained by adding 986 g. of 36% formalin, whose pH had been adjusted to 9.5, to 250 g. of melamine, and raising the temperature of the mixture to 100° C. over 20 minutes, after which it was refluxed for 120 minutes. The resulting solution had a specific gravity of 1.165. It was coated uniformly on the polyvinyl fluoride film by means of a roller, and the coated film was then air dried for 5 minutes and oven dried at 120° C. for 7 minutes.

The coated film was placed, coated side down, on the top of a stack comprising:

(a) A melamine-formaldehyde resin-impregnated cellulose overlay sheet, and
(b) 6 core sheets of kraft paper impregnated with phenol-formaldehyde resin.

The whole assembly was placed in a press and cured at 135°–148° C. under a pressure of 98 kg./cm.$^2$ for 27 minutes.

The resulting laminate when immersed in boiling water for 400 hours showed no sign of delamination or discoloration.

A similarly satisfactory product was obtained when the overlay sheet (a) was omitted.

While in the above examples a pre-formed sheet or film of polyvinyl fluoride has been used, it is equally possible to form the protective layer by melting polyvinyl fluoride onto the surface of the intermediate adhesive layer.

The aminotriazine-aldehyde resin used in the intermediate adhesive layer of the laminated products described previously is preferably a melamine-urea-formaldehyde resin in which the molar proportion of urea is at least two thirds, and preferably exceeds, that of melamine. The molar proportions of melamine, urea and formaldehyde in such resins are preferably in the range 0.9 to 1.1, 1 to 4.1 and 1.9 to 6.0 respectively. Melamine-urea-formaldehyde resins which are preferred are those in which the molar ratios of melamine, urea and formaldehyde are 1:1.33:2, 1:1.33:4, 1:0.66:2, 1:2.66:4, 1:2:6 and 1:4:6. The melamine-urea-formaldehyde resin is preferably made by first reacting the melamine with excess (i.e more than 6 molar proportions of) formaldehyde, and then after removing unreacted formaldehyde, heating the hexamethylol-melamine so obtained with urea. Usually 2 to 6, preferably 4 to 6, moles of urea will be employed for each mole of melamine.

The intermediate adhesive layer may consist solely of the melamine-urea-formaldehyde resin, or it may contain also one or more other resinous materials such for example as a phenol-formaldehyde or urea-formaldehyde resin, though it is preferable that the melamine-urea-formaldehyde resin makes up more than half and especially more than 70% of the total resin. For example a mixture of the melamine-urea-formaldehyde resin with urea-formaldehyde may be obtained by allowing some or all of the excess formaldehyde to remain in admixture with the hexamethylol-melamine when the latter is reacted with urea. The adhesive layer may also contain a polymer having a softening or plasticising action, preferably a polyvinyl acetal such a polyvinyl butyral, e.g. in amount from about 10 to 50% based on the total weight of the resin.

The melamine-urea-formaldehyde adhesive layer may, when the protective layer is transparent, serve as a decorative sheet, and for this purpose it may if desired carry a pattern. One way in which a decorative pattern may be applied to the intermediate adhesive layer is by an ink containing a melamine-urea-formaldehyde resin and a pigment or dye, such as cobalt orange. Preferably the melamine-urea-formaldehyde resin used in formulating the ink has the same composition as the resin used in the intermediate layer. The ink may be applied, for example, by the silk-screen printing process.

The following additional examples illustrate the use of melamine-urea-formaldehyde resins in the intermediate layer.

EXAMPLE 1

A melamine-urea-formaldehyde resin was made by first forming hexamethylol melamine in the known way, freeing it from excess formaldehyde, and heating it with 5.5 moles of urea for each mole of melamine.

A roll of 150 gram (g./m.$^2$) kraft paper was treated with a solution of phenol-formaldehyde resin to give a resin content between 32% and 35% and was thereafter dried to a stage at which the resin was only partly cured and had a volatile content between 3% and 6%. Equal sized core sheets were cut from the roll and a stack of 8 equal sized sheets was formed. An additional layer comprising a sheet of 130 gram paper impregnated with the above melamine-urea-formaldehyde resin was superimposed on the stack followed by a 0.025 mm. thick film of transparent polyvinyl fluoride. The transparent polyvinyl fluoride film had one face surface-activated, by the process of British specification No. 980,757, was placed with the surface-activated face downwards so that it was in contact with the melamine-urea-formaldehyde resin-impreganted layer. A second assembly was made up in a similar manner, and the two assemblies were placed face to face with the non-activated surfaces of the transparent polyvinyl fluoride films in contact with each other. The double assembly was then placed between the heated platens of a press and heated to 138° to 145° C. over a period of 20 minutes, after which the temperature was held at approximately 142° C. for 27 minutes while the assembly was subjected to a pressure of 1400 p.s.i. The laminates obtained were about 1/16 inch thick, and the transparent polyvinyl fluoride surface layers possessed a rippled surface finish. These laminates were designated Laminates 1. As a control the above procedure was repeated save that the polyvinyl fluoride film was bonded directly to the top of the stack of phenol-formaldehyde resin-impregnated core sheets. The control laminates were designated Laminates 2.

EXAMPLE 2

Laminates were prepared as in Example 1, except that a stack of 4 equal sized phenol-formaldehyde resin-impregnated sheets were used and the laminates after pressing were approximately 1/32 inch thick. These laminates were designated Laminates 3. Controls were prepared using the 4 core sheets only, and were designated Laminates 4.

EXAMPLE 3

Laminates were prepared as in Example 2, except that a fire resistant-composition was used to impregnate the roll of kraft paper. The fire-resistant composition was prepared from a conventional phenol-formaldehyde resin (1 mole phenol to 1.4 moles formaldehyde catalysed with 0.03 mole of sodium hydroxide) in an aqueous solution but treated with ortho-boric acid to reduce the pH of the resin from about 8.2 to between 7.0 and 7.5. To this resinous composition melamine-formaldehyde resin was added (1 mole melamine to 2.75 moles formaldehyde catalysed with 0.0025 mole of sodium hydroxide) in aqueous solution, in the proportion of one part melamine resin to two parts of phenolic-resin, based on the solids contents of the resins. 5% of sodium metaborate, calculated on the total solids of the phenolic-melamine resin mixture, was then added. (Other fire resistant resinous compositions may be used to impregnate the roll of kraft paper in the preparation of fire resistant core sheets, for example compositions containing other salts such as sodium pentaborate, borax, monoammonium phosphate, disodium phosphate, or triethanolamine phosphate.)

A melamine-urea-formaldehyde resin-impregnated sheet was superimposed on the stack of 4 resin-impregnated kraft paper sheets, followed by a sheet of transparent polyvinyl fluoride, and whole assembly was consolidated in a press as in Example 1. The laminates obtained were designated Laminates 5. Control laminates without the melamine-urea-formaldehyde resin layer were also made, and designated Laminates 6.

EXAMPLE 4

Example 3 was repeated save that a stack of 8 core sheets was used. The laminates were designated as Laminates 7, and the controls as Laminates 8.

The properties of the laminates of the examples and controls are sumarised in Table I:

PVF _____ Polyvinyl fluoride.
MUF _____ Melamine-urea-formaldehyde resin.
PF _____ Phenol-formaldehyde resin.

TABLE I

| Laminate | Assembly | 100 hour boil test |
|---|---|---|
| 1 | 1 PVF transparent film, 1 MUF layer, 8 PF core sheets. | After 300 hours no delamination, no peeling test possible, no blisters on surface. |
| 2 | 1 PVF transparent film, 8 PF core sheets. | After 50 hours no delamination but it is possible to peel the PVF film from the base sheets. |
| 3 | 1 PVF transparent film, 1 MUF layer, 4 PF core sheets. | After 300 hours no delamination, no peeling test possible, no blisters on surface. |
| 4 | 1 PVF transparent film, 4 PF core sheets. | After 50 hours no delamination, but it is possible to peel the PVF sheet from the base sheets. |
| 5 | 1 PVF transparent film, 1 MUF layer, 4 fireproof core sheets. | After 150 hours no delamination, no peeling test possible, no blisters on surface. |
| 6 | 1 PVF transparent film, 4 fireproof core sheets. | After 50 hours no delamination but it is possible to peel the PVF film from the base. |
| 7 | 1 PVF transparent film, 1 MUF layer, 8 fireproof core sheets. | After 150 hours no delamination, no peeling test possible, no blisters on surface. |
| 8 | 1 PVF transparent film, 8 fireproof core sheets. | After 50 hours no delamination but it is possible to peel the PVF film from the base. |

EXAMPLE 5

A melamine-urea-formaldehyde resin was made by first forming a methylol melamine in the known way, using 1 mole of melamine to 2 moles of formaldehyde, and then reacting it with 1.33 moles of urea for each mole of melamine.

A roll of 80 gram per square metre kraft paper was treated with a fire-resistant, ammonium-catalysed phenol-formaldehyde resin to give a resin content between 32% and 35% (on the weight of the resin and paper) and was thereafter dried to a stage at which the resin was only partly cured and had a volatile content between 3% and 6% (by weight). Equal size core sheets were cut from the roll and a stack of 8 such sheets was formed. One additional layer bearing a decorative design comprising a sheet of 130 gram per square metre paper impregnated with the above melamine-urea-formaldehyde resin was superimposed on the stack followed by a 0.025 mm. thick film of transparent polyvinyl fluoride. The transparent polyvinyl fluoride film had one face surface-activated, for example by the process of British patent specification No. 890,466, and was placed with the surface-activated face downwards so that it was in contact with the malamine-urea-formaldehyde resin-impregnated layer. A second assembly was made up in a similar manner and the two assemblies were placed face to face with the non-activated surfaces of the transparent polyvinyl fluoride films in contact with each other. The double assembly was then placed between the heated platens of a press and heated to between 130° and 135° C. over a period of 20 minutes, after which the temperature was held at approximately 133° C. for 60 minutes while the assembly was subjected to a pressure of 1400 p.s.i.

The laminates obtained were about 1/32 inch thick and transparent polyvinyl fluoride surface layers possessed a rippled surface finish. These laminates were designated Laminates 9. As a control the above procedure was repeated save that the polyvinyl fluoride film was bonded directly to the top of the stack of fire-resistant, ammonium-catalysed, phenol-formaldehyde impregnated core sheets. The control laminates were designated Laminates 10.

EXAMPLE 6

Example 5 was repeated save that the molecular proportions of melamine, formaldehyde and urea were 1 mole malamine, 4 moles formaldehyde and 1.33 moles urea. These laminates were designated Laminates 11 and control laminates prepared by bonding the polyvinyl film directly to the top of the stack of fire-resistant, ammonium-catalysed, phenol-formaldehyde sheets were designated Laminates 12.

EXAMPLE 7

Example 5 was repeated save that the molecular proportions of melamine, formaldehyde and urea were 1 mole malamine, 4 moles formaldehyde and 2.66 moles urea. These laminates were designated Laminates 13 and control laminates prepared by bonding the polyvinyl film directly to the top of the stack of fire-resistant, ammonium-catalysed, phenol-formaldehyde sheets were designated Laminates 14.

EXAMPLE 8

Example 5 was repeated save that the molecular proportions of melamine, formaldehyde and urea were 1 mole melamine, 6 moles formaldehyde and 2.75 moles urea. A cadmium orange ink was prepared from 105 parts by weight cadmium orange pigment, 40 parts by weight of malamine-urea-formaldehyde resin in the molar ratio of 1:6:2.75 containing 7 parts by weight of methylated spirits. To this were added 40 parts by weight of a water miscible solvent (e.g. diacetone alcohol). This mixture was then ground on a triple roll mill to a consistency of a fine paste. The ink was then applied to the plastic based paper previously impregnated with melamine-urea-formaldehyde resin using the silk screen printing process. This decorative sheet was then dried to remove solvent and produce a volatile content not greater than 6% by weight before placing the sheet between the core and the transparent polyvinyl fluoride film. Laminates produced by hot-pressing the assemblies were designated Laminates 15 and control laminates prepared by bonding the polyvinyl film directly to the top of the stack of fire-resistant, ammonimum-catalysed, phenol-formaldehyde sheets were designated Laminates 16.

EXAMPLE 9

Example 5 was repeated save that the molecular proportions of melamine, formaldehyde and urea were 1 mole melamine, 6 moles formaldehyde and 4 moles urea. These laminates were designated Laminates 17 and control laminates prepared by bonding the polyvinyl film directly to the top of the stack of fire-resistant, ammonium-catalysed, phenol-formaldehyde sheets were designated Laminates 18.

EXAMPLE 10

Example 5 was repeated save that a 0.025 mm. thick film of polyvinyl fluoride pigmented with a white pigment was used. The laminates produced were designated Laminates 19 and control laminates prepared by bonding the pigmented polyvinyl fluoride directly to the top of the stack were designated Laminates 20.

Example 5 was repeated save that the molecular proportions of melamine, formaldehyde and urea were 1 mole melamine, 2 moles formaldehyde and 0.66 mole urea. These laminates were designated Laminates 21 and control laminates prepared by bonding the polyvinyl film directly to the top of the stack of core sheets were designated Laminates 22.

The properties of Laminates 9–22 whose preparation is described in Examples 5–11 are summarised in Table II.

TABLE II

| Laminates | Assembly | 100 hour boil test |
|---|---|---|
| 9 | 1 PVF transparent film, 1 MUF layer mole ratio 1:1.3:2, 8 PF core sheets. | No change after 100 hrs. (i.e. no delamination; no peel test possible and no blisters on the surface). |
| 10 | 1 PVF transparent film, 8 PF core sheets. | No blisters but a peel test could be made after 100 hrs. |
| 11 | 1 PVF transparent film, 1 MUF layer mole ratio 1.0:1.33:4.0, 8 PF core sheets. | No change after 100 hrs. |
| 12 | 1 PVF transparent film, 8 PF core sheets. | No blisters but a peel test could be made after 100 hrs. |
| 13 | 1 PVF transparent film, 1 MUF layer mole ratio 1:2.66:4.0, 8 PF core sheets. | No change after 100 hrs. |
| 14 | 1 PVF transparent film, 8 PF core sheets. | No blisters but a peel test could be made after 100 hrs. |
| 15 | 1 PVF transparent film, 1 MUF layer mole ratio 1:2.75:6.0, 8 PF core sheets. | No change after 100 hrs. |
| 16 | 1 PVF transparent film, 8 PF core sheets. | No blisters but a peel test could be made after 100 hrs. |
| 17 | 1 PVF transparent film, 1 MUF layer mole ratio 1.0:4.0:6.0, 8 PF core sheets. | No change after 100 hrs. |
| 18 | 1 PVF transparent film, 8 PF core sheets. | No blisters but a peel test could be made after 100 hrs. |
| 19 | 1 PVF pigmented film, 1 MUF layer mole ratio 1.0:2.75:6.0, 8 PF core sheets. | No change after 100 hrs. |
| 20 | 1 PVF pigmented film, 8 PF core sheets. | No blisters but a peel test could be made after 100 hrs.; colour shadow effect. |
| 21 | 1 PVF transparent film, 1 MUF layer mole ratio 1.0:0.66:2.0, 8 PF core sheets. | No change after 100 hrs. |
| 22 | 1 PVF transparent film, 8 PF core sheets. | No blisters but a peel test could be made after 100 hrs. |

Abbreviations as used in Table I.

We claim:
1. A resin impregnated laminate in which a protective layer of film-forming fluorine-containing organic polymer is bonded to a core comprising at least one sheet impregnated with a resin selected from the group consisting of phenol-formaldehyde, urea-formaldehyde and phenol-urea-formaldehyde resins by means of an intermediate adhesive layer comprising a resin selected from the group which consists of aminotriazine-aldehyde and substituted aminotriazine-aldehyde resins.

2. A laminate according to claim 1, wherein the fluorine-containing polymer is polyvinyl fluoride.

3. A laminate according to claim 1, wherein the protective layer is transparent and the intermediate adhesive layer is in the form of a sheet carrying a decorative pattern.

4. A laminate according to claim 1, wherein the protective layer is transparent and the intermediate adhesive layer overlies a sheet carrying a decorative pattern.

5. A laminate according to claim 1, wherein the intermediate adhesive layer is in the form of a fibrous sheet impregnated with a melamine-formaldehyde resin.

6. A laminate according to claim 1, wherein the intermediate adhesive layer contains also at least one resin of a different type in amount not exceeding 50% of the total resin content.

7. A laminate according to claim 6, wherein the intermediate adhesive layer contains 10–50% (based on the total weight of resin) of a polyvinyl acetal as plasticiser.

8. A laminate according to claim 1, wherein the intermediate adhesive layer comprises a melamine-urea-formaldehyde resin in which the molar proportion of urea is at least two thirds that of melamine.

9. A laminate according to claim 8, wherein the molar proportions of melamine, urea and formaldehyde are from 0.9 to 1.1, 1.0 to 4.1 and 1.9 to 6.0 respectively.

10. A laminate according to claim 8, wherein the protective layer is transparent and the intermediate adhesive layer is in the form of a sheet carrying a decorative pattern applied thereto by an ink containing a melamine-urea-formaldehyde resin and a pigment.

11. A resin impregnated laminate in which a protective layer of polyvinyl fluoride is bonded to a core comprising a plurality of fibrous sheets impregnated with a resin selected from the group which consists of phenol-formaldehyde, urea-formaldehyde and phenol-urea-formaldehyde resins by means of an intermediate layer comprising a melamine-formaldehyde resin in proportion 50–100% of its total resin content.

12. A laminate according to claim 11, wherein the intermediate layer comprises a melamine-urea-formaldehyde resin in which the molar proportion of urea is at least two thirds that of melamine.

13. A process for the production of a resin impregnated laminate, which comprises forming an assembly of at least one core sheet impregnated with a resin selected from the group which consists of phenol-formaldehyde, urea-formaldehyde and phenol-urea-formaldehyde resins, an intermediate layer comprising a resin selected from the group which consists of aminotriazine-aldehyde and substituted aminotriazine-aldehyde resins and an outer protective sheet of a film-forming fluorine-containing organic polymer, and curing the assembly by means of heat under pressure.

14. A process according to claim 13, wherein the intermediate adhesive layer is formed by coating a composition comprising an uncured reaction product of melamine, urea and formaldehyde on at least one of the protective sheet and the uppermost core sheet.

References Cited

UNITED STATES PATENTS

| | | | |
|---|---|---|---|
| 3,340,137 | 9/1967 | Kamal | 156—331 X |
| 3,369,960 | 2/1968 | Sedlak et al. | 161—248 X |
| 2,499,134 | 2/1950 | De Bruyne | 161—248 X |
| 2,694,028 | 11/1954 | Rapp | 161—258 X |
| 2,739,081 | 3/1956 | Wohnsiedler | 161—258 X |
| 3,133,854 | 5/1964 | Simms | 161—189 |
| 3,135,643 | 6/1964 | Michl | 161—258 |
| 3,345,248 | 10/1967 | Pounds et al. | 161—413 X |

OTHER REFERENCES

Technical Information Manual, Dupont, Tedlar, P.V.F. Film, Bulletin TD–10, "Laminating," September 1962, copy in Class 161—Tedlar Digest (Group 160).

HAROLD ANSHER, *Primary Examiner.*